US012629976B2

(12) United States Patent
Gumbel et al.

(10) Patent No.: US 12,629,976 B2
(45) Date of Patent: ***May 19, 2026

(54) MODULAR AXLE CLAMP AND RISER SYSTEM

(71) Applicant: Hendrickson Mt. Vernon, LLC, Schaumburg, IL (US)

(72) Inventors: Christopher Ryan Gumbel, Brookston, IN (US); John Hinz, Monticello, IN (US)

(73) Assignee: Hendrickson Mt. Vernon, LLC, Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/280,341

(22) Filed: Jul. 25, 2025

(65) Prior Publication Data

US 2025/0353341 A1      Nov. 20, 2025

Related U.S. Application Data

(62) Division of application No. 17/932,518, filed on Sep. 15, 2022, now Pat. No. 12,397,600.

(60) Provisional application No. 63/261,246, filed on Sep. 15, 2021.

(51) Int. Cl.
B60G 9/04          (2006.01)
(52) U.S. Cl.
CPC ..................................... B60G 9/04 (2013.01)
(58) Field of Classification Search
CPC .............................. B60G 2206/91; B60G 9/04
USPC ....................................................... 280/284
See application file for complete search history.

(56) References Cited

U.S. PATENT DOCUMENTS

| | | | | |
|---|---|---|---|---|
| 3,913,937 | A | * 10/1975 | Longworth | ........... B60G 11/113 |
| | | | | 267/52 |
| 5,675,784 | A | * 10/1997 | Maxwell | ................ G06Q 10/10 |
| 7,882,156 | B2 | * 2/2011 | Wykes | ............... G06Q 30/0603 |
| | | | | 707/948 |
| 8,517,655 | B2 | * 8/2013 | Wang | .................... F16B 43/009 |
| | | | | 411/538 |
| 10,387,827 | B2 | * 8/2019 | Poncher | ............... G06Q 10/087 |
| 11,282,029 | B2 | * 3/2022 | Poncher | ............... G06Q 10/087 |
| 2007/0100842 | A1 | * 5/2007 | Wykes | ............... G06Q 30/0603 |
| 2009/0249606 | A1 | * 10/2009 | Diez | .................... B25J 15/0608 |
| | | | | 29/428 |
| 2020/0005232 | A1 | * 1/2020 | Poncher | ................. G06F 16/25 |

* cited by examiner

*Primary Examiner* — Jason D Shanske
*Assistant Examiner* — Caitlin Anne Miller
(74) *Attorney, Agent, or Firm* — Dureska & Moore, LLC; David P. Dureska; Benjamin J. Chojnacki

(57) ABSTRACT

A modular axle clamp and riser system for use in a suspension system, which includes a top mount having a substantially flat upper surface, a top mount body which extends transversely to the flat upper surface, a pair of opposing ears which extend from the top mount body, and at least one top mount tooth extending from the top mount body in a direction opposite the ears. Also included is a wedge with at least one wedge tooth which matingly engages the at least one top mount tooth, a wedge upper surface, and a pinion angle surface. Further, the wedge defines a pinion angle between the wedge upper surface and the pinion angle surface. Moreover, an axle mount with at least one axle mount tooth which matingly engages at least one of the at least one top mount tooth and the at least one wedge tooth is provided.

3 Claims, 20 Drawing Sheets

18

66              38

58

39

38

39

58

42

38

18

66

58

38

39

38

58

39

38

58

42

0°

4°

6°

MODULAR AXLE CLAMP AND RISER SYSTEM

RELATED APPLICATION

This application is a divisional of U.S. patent application Ser. No. 17/932,518, filed on Sep. 15, 2022, which claims priority under 35 USC 119 from U.S. Provisional application Ser. No. 63/261,246 filed Sep. 15, 2021, the entire contents of which are incorporated by reference herein.

BACKGROUND

The present disclosure relates generally to vehicle suspensions used on heavy duty trucks, buses, recreational vehicles and the like, and more specifically to clamping systems for securing the springs to the suspension.

An important part of any vehicle suspension system is the clamping system used in the suspension system. However, these clamping systems are particularly important for heavy vehicles, where the suspension system experiences significant loading. Additionally, there are many different configurations for suspension systems, as many auto manufacturers have specialized parts that are specific to the vehicles they manufacture. As such, it is difficult to supply clamping systems that can complement all of the various axle designs that exist. Even minor variations in the design of the axle or other components of the suspension system can necessitate a completely different clamping system. In the past, manufacturers of such clamping systems have had to specially assemble and/or manufacture each of the multi-component clamping systems to meet performance and handling requirements in a wide variety of suspension systems produced by auto manufacturers. This often results in having to inventory or monitor and/or produce thousands of different clamping systems.

In particular, each variation in the clamping system involves different production tooling. Whether the variation is adjusting the location of a through hole or adjusting the angle of one of the internal components, each minor change also involves unique and/or specialized machining. In turn, these minor changes have to be designed first, which takes significant effort. Then, the required tooling needs to be prepared. For low quantity orders, this process is not cost effective. However, with the wide range of variations that exist in suspension systems, there are many times where orders for a particular configuration of a clamping system may only be used by a handful of vehicles. Therefore, the manufacturer is faced with the decision of whether to produce a few clamping systems for which they may not be able to generate a profit or refuse to supply the parts and risk losing potential customers.

Additionally, many operators of heavy vehicles prefer that the heavy vehicle suspension system be designed such that the ride height is increased, with the body of the vehicle farther from the ground. To accomplish this, the clamping system typically includes spacers. However, the inclusion of these spacers, with the fact that certain customers prefer different levels of ride height, provides another variable design parameter that is accounted for in producing clamping systems. Accordingly, there is the need for a clamping system which allows for accommodation of the many variations that exists in suspension systems without the significant cost and effort that is required at present.

SUMMARY

The above listed need is met or exceeded by the present modular axle clamp and riser system. An important feature of the present disclosure is the use of interchangeable, easily assembled components which make it significantly more cost effective to accommodate the many variations in clamping systems that are requested by vehicle manufacturers. A source of expense associated with non-interchangeable clamping systems is caused by the need for minor variation in one particular part of the clamping system. For instance, a guide slot located at the bottom of the clamping system may need to be offset for a given customer. Under current systems, this would potentially necessitate generating an entirely clamping system. However, with the interchangeable components of the present disclosure, only the single component which houses the guide slot needs to be adjusted to satisfy the specific configuration requested by the consumer. In the same fashion, each of the components has a relatively small number of variations needed to cover a wide range of potential design configurations.

As further illustration, if there were six exemplary total variations in each of the three standard components that make up the presently disclosed modular axle clamp and riser system, there would be a total of 216 combinations of the modular axle clamp and riser system that could be achieved. Previously, 216 different parts would be needed to cover each of these combinations, each part being separately designed, manufactured and potentially inventoried. With the presently disclosed innovative design, a total of eighteen individual components can accomplish the same number of clamping system variations.

In addition to significantly reducing the cost and effort associated with manufacturing various modular axle clamp and riser systems, the present disclosure also provides the possibility of implementing a smart part numbering system, where each part is assigned a unique part number. In particular, each component of the modular axle clamp and riser system has a component level digit which specifies the particular component type, and at least one variation level digit which is associated with various design features of the components. Therefore, each set of design parameters for a given component is denoted with a single unique part number which includes both of the component level digit and the at least one variation level digit. This allows a consumer to choose their unique combination of components to build the desired modular axle clamp and riser system, thereby significantly increasing the convenience for the consumer. Specifically, the consumer can either select the particular components based on the unique part numbers for each part, or the consumer can provide the desired design parameters, and the smart part numbering system will provide the requested modular axle clamp and riser system.

Moreover, the interchangeable components of the present modular axle clamp and riser system are designed to easily fit together, thereby reducing the cost of assembling and welding the clamping system by providing the possibility of robotically welded the components. Additionally, the interface between the interchangeable components is designed to include either chamfered or filleted edges, thereby creating a groove where the parts are welded together. This allows the weld material to penetrate into the seem between the parts, and it greatly reduces the needed weld prep, as the groove provides the path for welding.

Another benefit of the presently disclosed modular axle clamp and riser system is that the amount of post-fabrication machining is significantly reduced. Specifically, the individual components are designed such that they need not be machined, and upon assembly, they are welded together. As machining is a considerable expense, removing this step in the manufacturing process significantly reduces cost. Further, the present disclosure includes an axle mount that constitutes the bottom component of the modular axle clamp and riser system. A common requirement for the axle mount includes an offset guide slot. With the currently disclosed assembly, the axle mount is symmetrical from front to back, providing the ability to simply rotate the axle mount with respect to the rest of the clamping system, thereby reducing the number of variations needed for the axle mount. Additionally, a pinion angle of the modular axle clamp and riser system is adjustable by simply adjusting a single of the interchangeable components.

More specifically, the present disclosure includes a modular axle clamp and riser system for use in a suspension system, which includes a top mount having a substantially flat upper surface, a top mount body which extends transversely to the flat upper surface, a pair of opposing ears which extend from the top mount body and include eyelets for receiving a torque arm of the suspension system, and at least one top mount tooth extending from the top mount body in a direction opposite the ears. Also included is a wedge with at least one wedge tooth which matingly engages the at least one top mount tooth, a wedge upper surface, and a pinion angle surface. Further, the wedge defines a pinion angle between the wedge upper surface and the pinion angle surface. Additionally, the wedge upper surface is parallel to the top mount flat upper surface. Moreover, the present modular axle clamp and riser system includes an axle mount with at least one axle mount tooth which matingly engages at least one of the at least one top mount tooth and the at least one wedge tooth.

In an embodiment, the axle mount has a guide slot configured for receiving a dowel pin connected to an axle of said suspension system. An alternate embodiment includes a lower spacer located between the top mount and the wedge, such that the lower spacer includes at least one lower spacer tooth, where the lower spacer tooth is configured to matingly engage with at least one of the at least one top mount tooth and the at least one wedge tooth. In yet another embodiment, the modular axle clamp and riser system has an upper spacer which includes a locating post configured to fit within a locating hole in the top mount flat upper surface.

Preferably, the teeth of the top mount, the wedge and the axle mount are welded together. Preferably still, the at least one axle mount tooth is directly in front of the at least one wedge tooth, the at least one axle mount tooth fits within at least one top mount recess, and the at least one top mount tooth fits within at least one axle mount recess, whereby the at least one wedge tooth is located between the at least one axle mount tooth and the at least one top mount recess. In an embodiment, the at least one axle mount tooth and the at least one axle mount cavity alternate with the at least top mount tooth and the at least one top mount cavity. Another preferred embodiment includes an interface where the teeth matingly engage one another, and the teeth have rounded edges at each point along the interface, such that said rounded edges form a passageway for the weld material when the top mount, the wedge, and the axle mount are assembled. Preferably, the interface between the teeth of the top mount, the wedge and the axle mount includes at least one segment which is parallel to the axis which runs through the teeth.

Preferably, the wedge and the axle mount have a second set of mating teeth, the torque pin is connected to the eyelets by one of a bar pin, a through bolt, or an hourglass bushing, and the dowel pin is welded to the axle.

A second embodiment of the present disclosure is a smart part numbering system for a modular axle clamp and riser system, which includes a computer processor and a non-transitory, computer-readable medium encoded with computer-readable instructions. When these instructions are executed by the computer processor, the system generates a unique part number for each component of the modular axle clamp and riser system. In particular, the part number includes a component level digit which specifies the particular component type, and at least one variation level digit which is associated with various design features of the components, such that each set of design parameters for a given component are denoted with a single unique part number which includes the component level digit and the at least one variation level digit. Further, the instructions store the unique part numbers in a part library along with the specific design parameters associated with the unique part number. Additionally, the instructions receive one or more user inputs, each user input indicating a selection of either the design parameters or the unique part number combination desired for the modular axle clamp and riser system. Moreover, the instructions determine a requested modular axle clamp and riser system based on either the design parameters or the unique part number combination provided by the user and generate the requested modular axle clamp and riser system.

DETAILED DESCRIPTION

Figure 1:
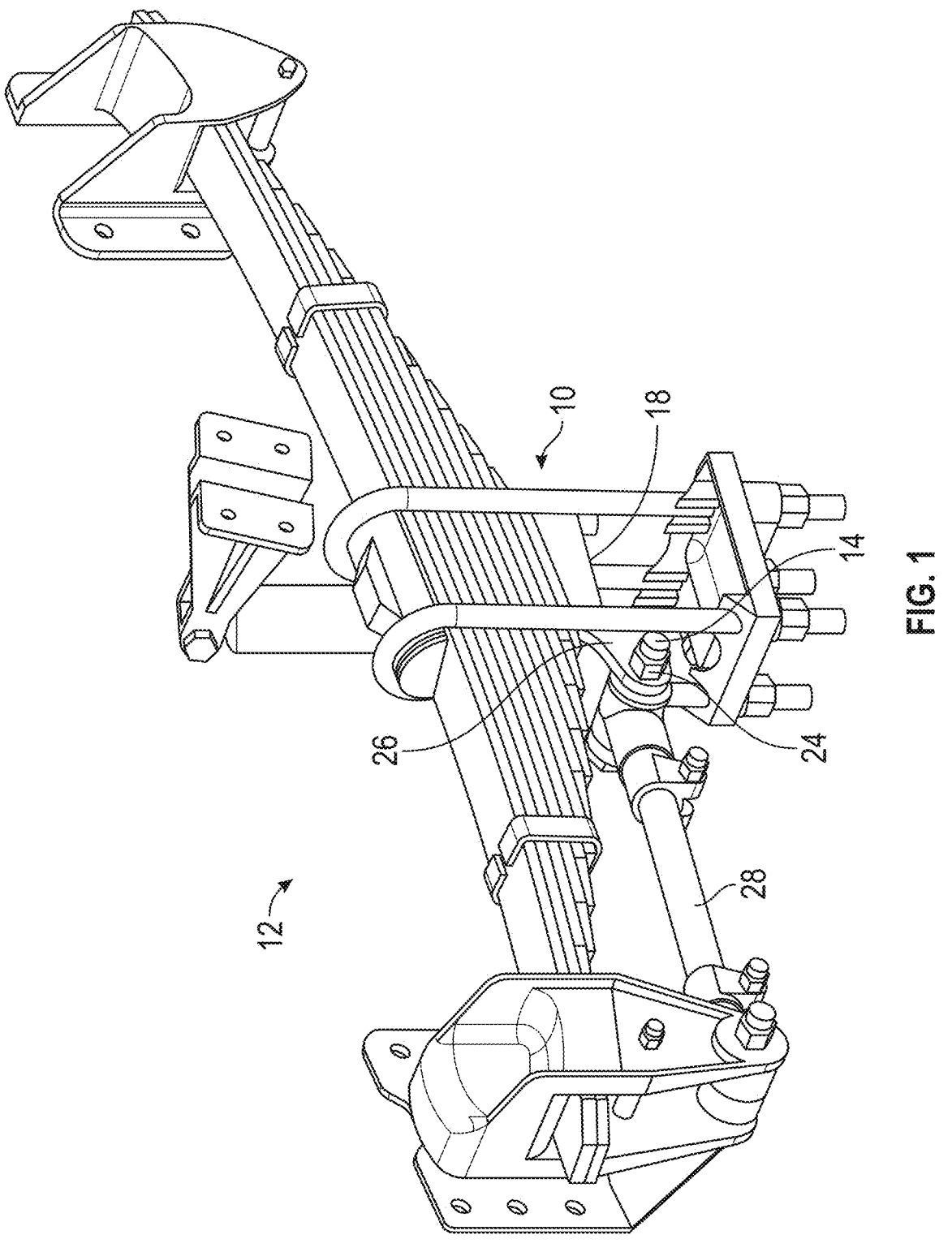
FIG. 1 is a side perspective view of a suspension system which includes the present modular axle clamp and riser system.
Figure 2:
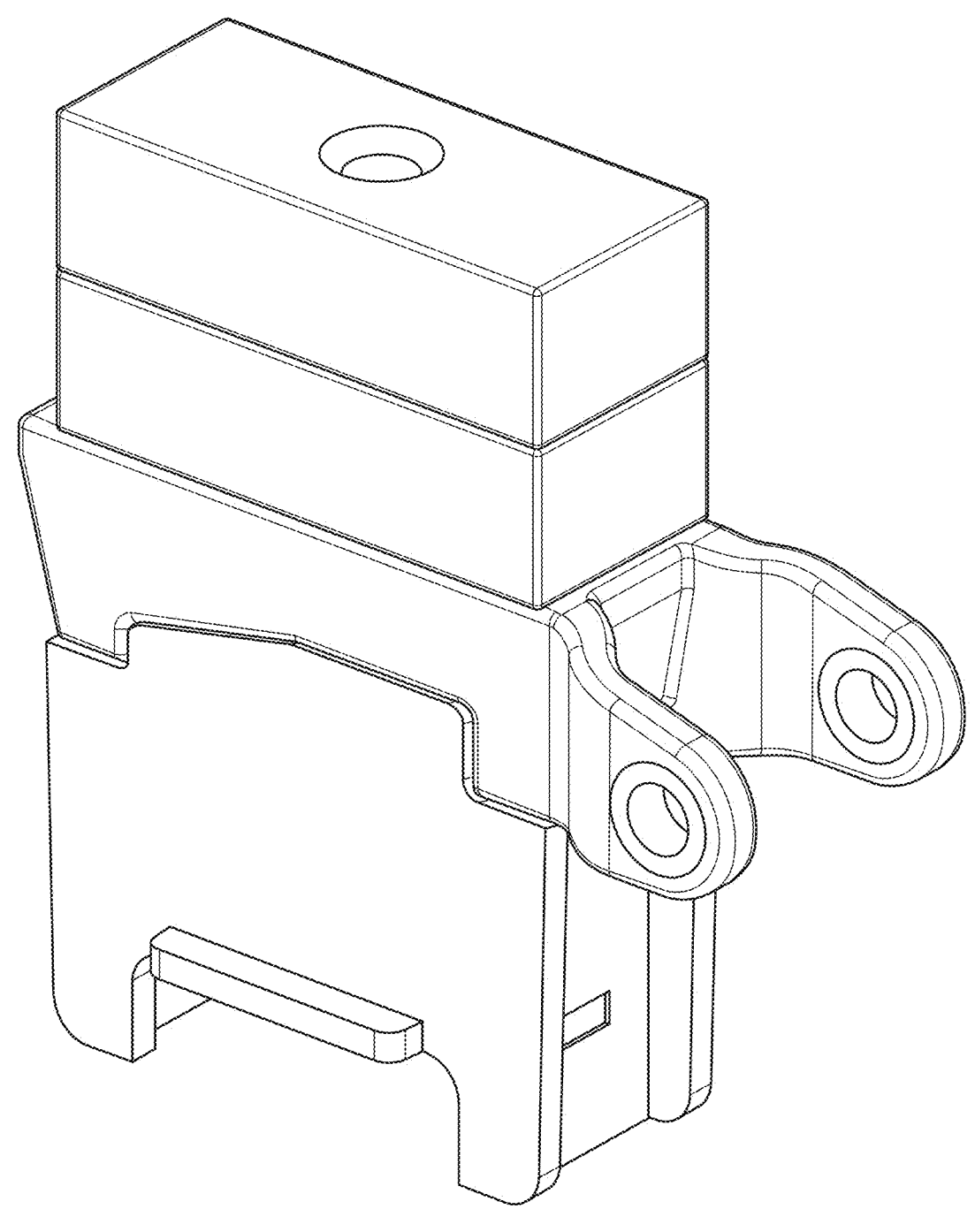
FIG. 2 is a side perspective view of a prior art clamping system with spacers used in a suspension system.
Figure 3:
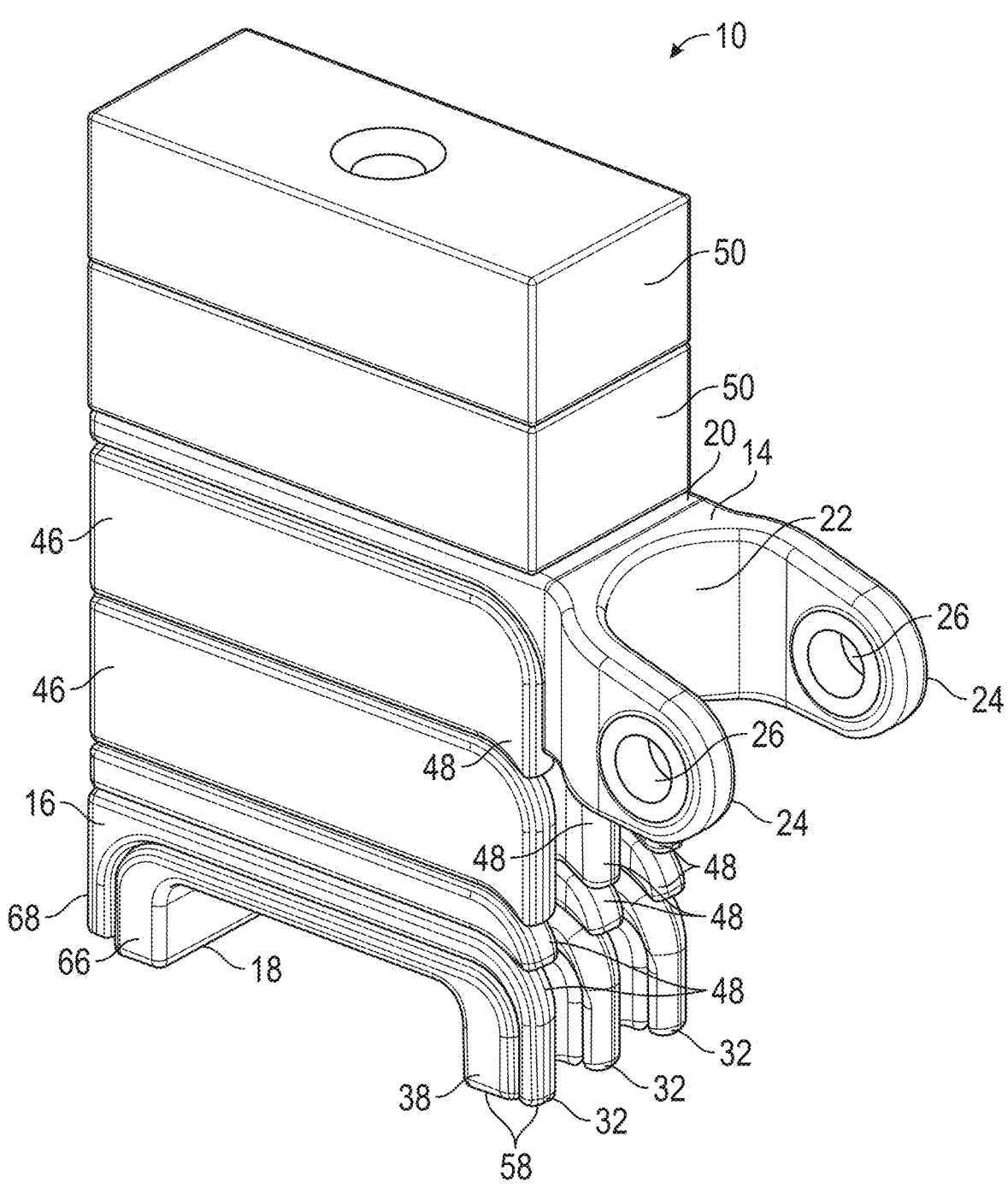
FIG. 3 is a side perspective view of the present modular axle clamp and riser system with upper and lower spacers.
Figure 4:
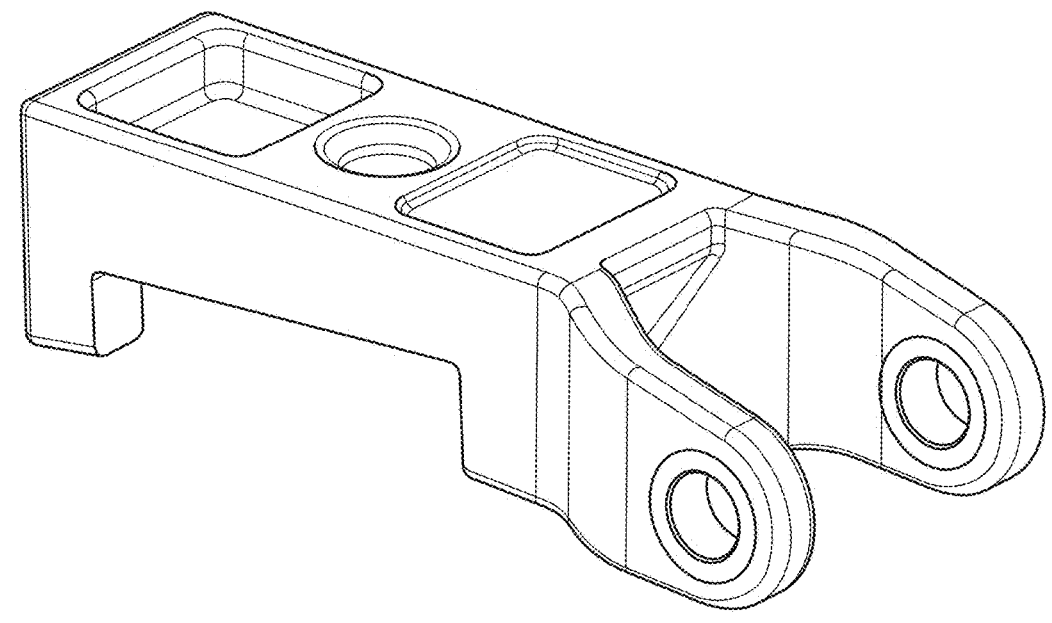
FIG. 4 is a side perspective view of a prior art clamping system without spacers.
Figure 5:
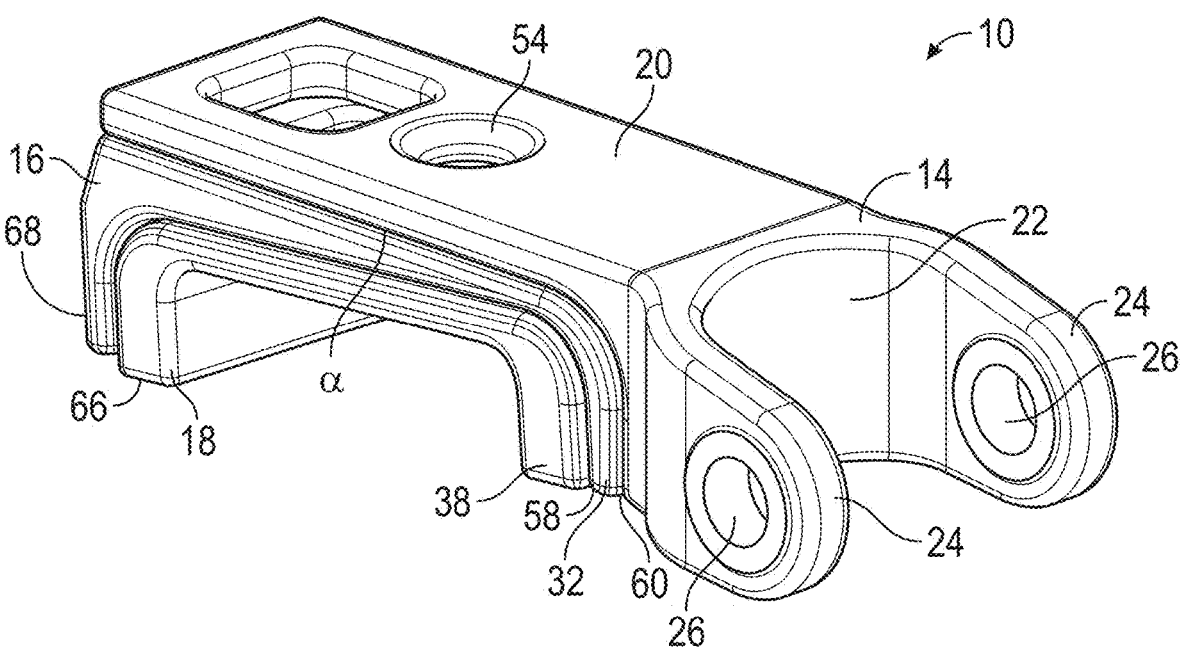
FIG. 5 is a side perspective view of the present modular axle clamp and riser system without spacers.
Figure 6:
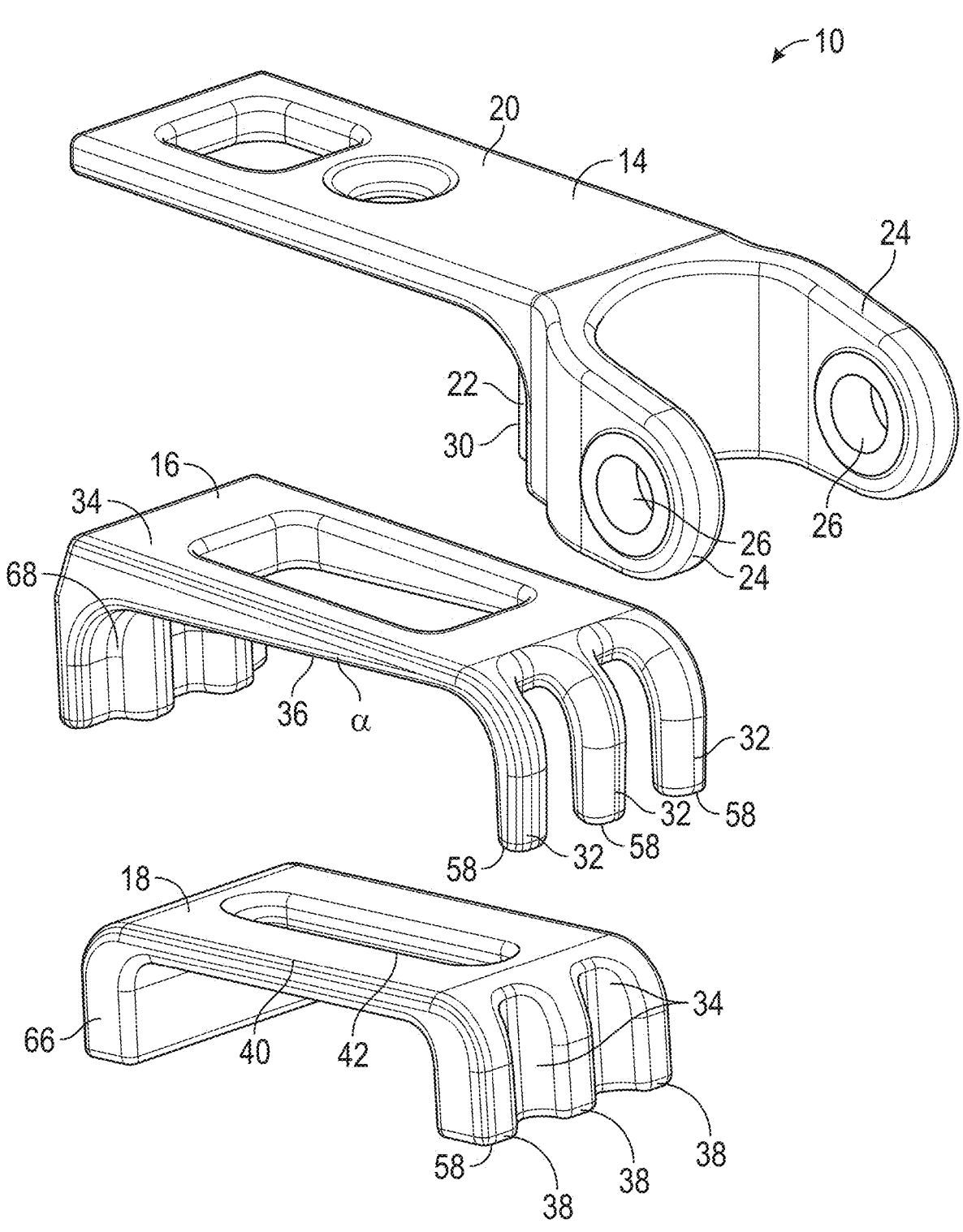
FIG. 6 is a side exploded perspective view of the present modular axle clamp and riser system without spacers.
Figure 7:
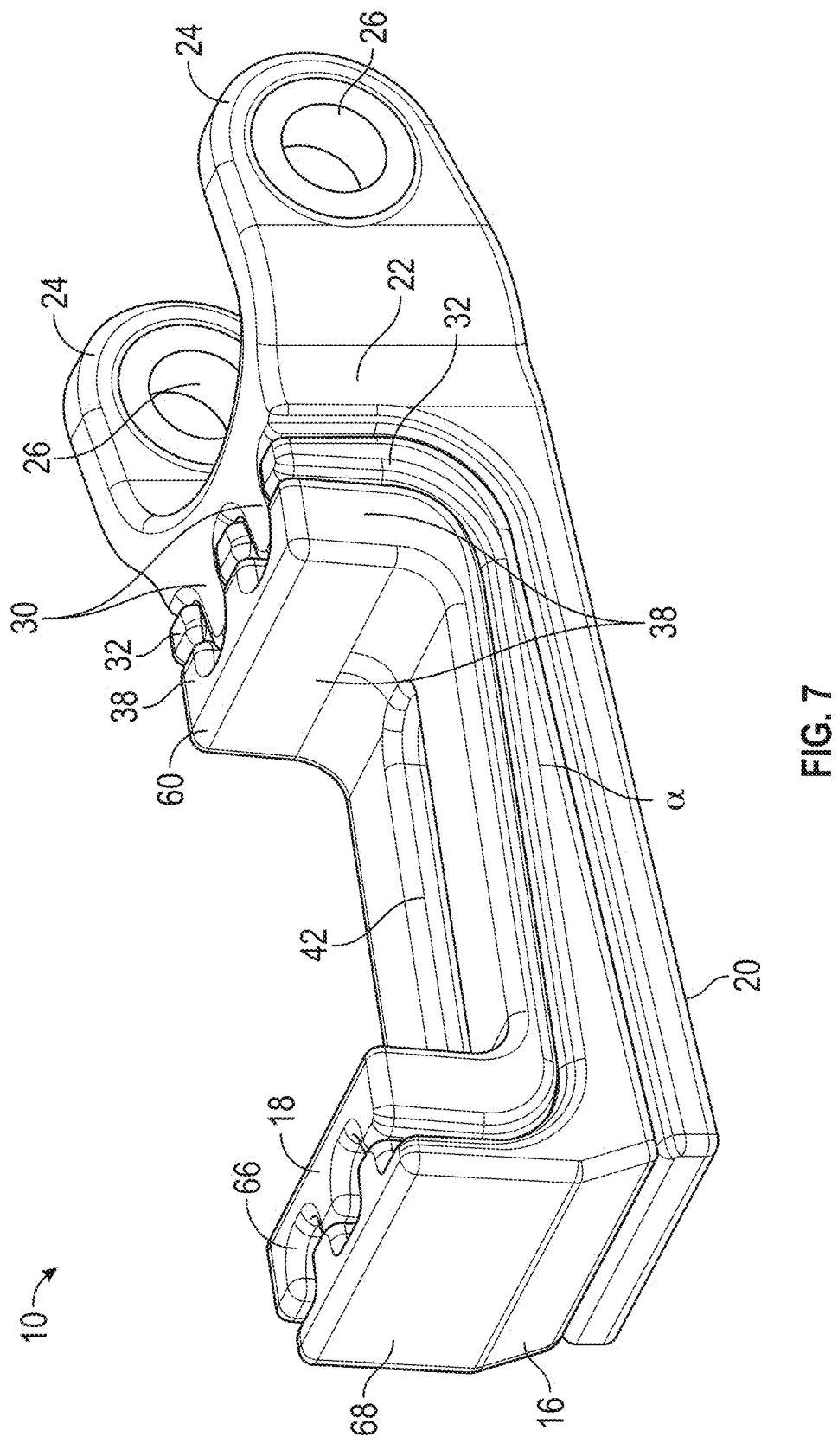
FIG. 7 is a bottom perspective view of the present modular axle clamp and riser system without spacers.
Figure 8:
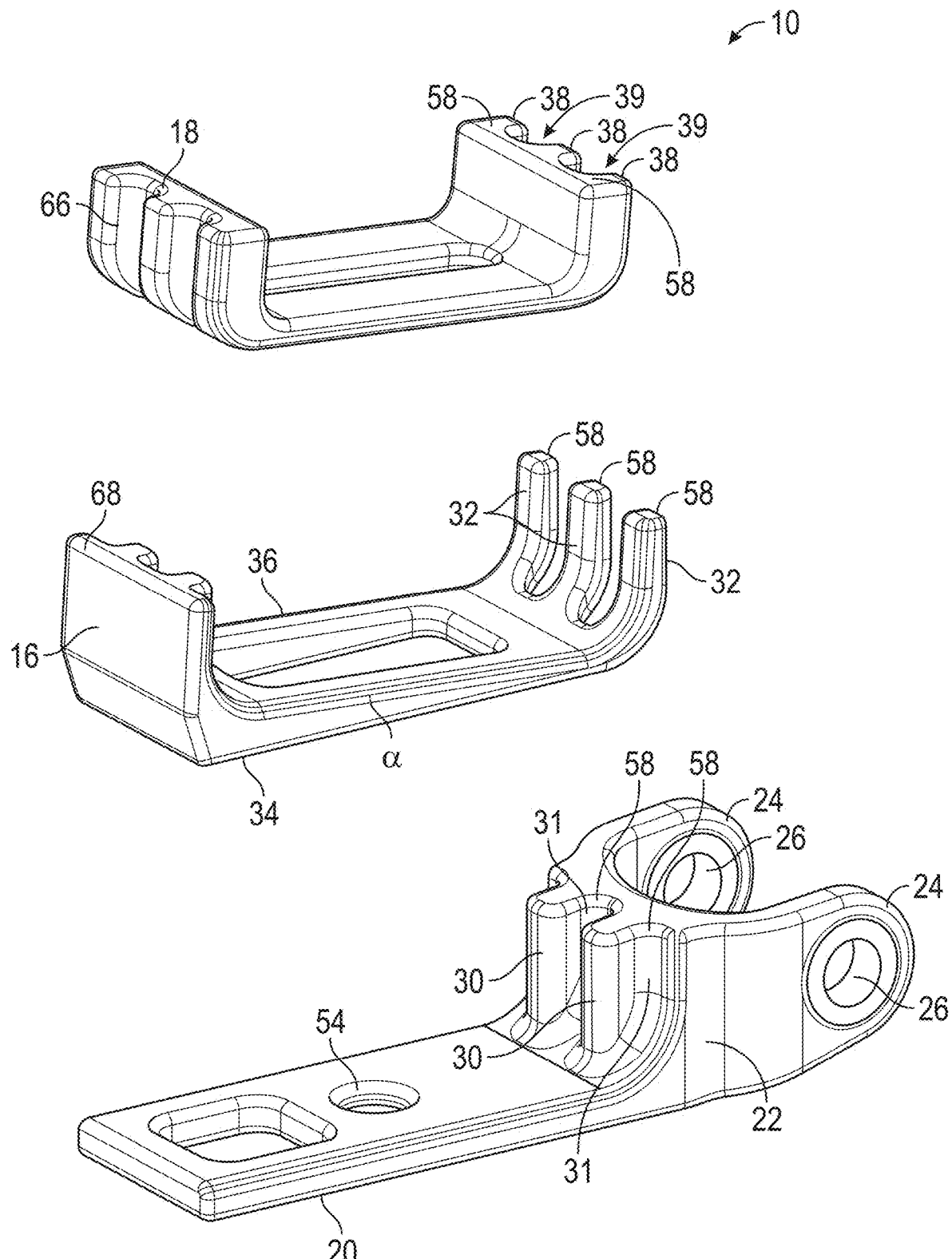
FIG. 8 is a bottom exploded perspective view of the present modular axle clamp and riser system without spacers.
Figure 9:
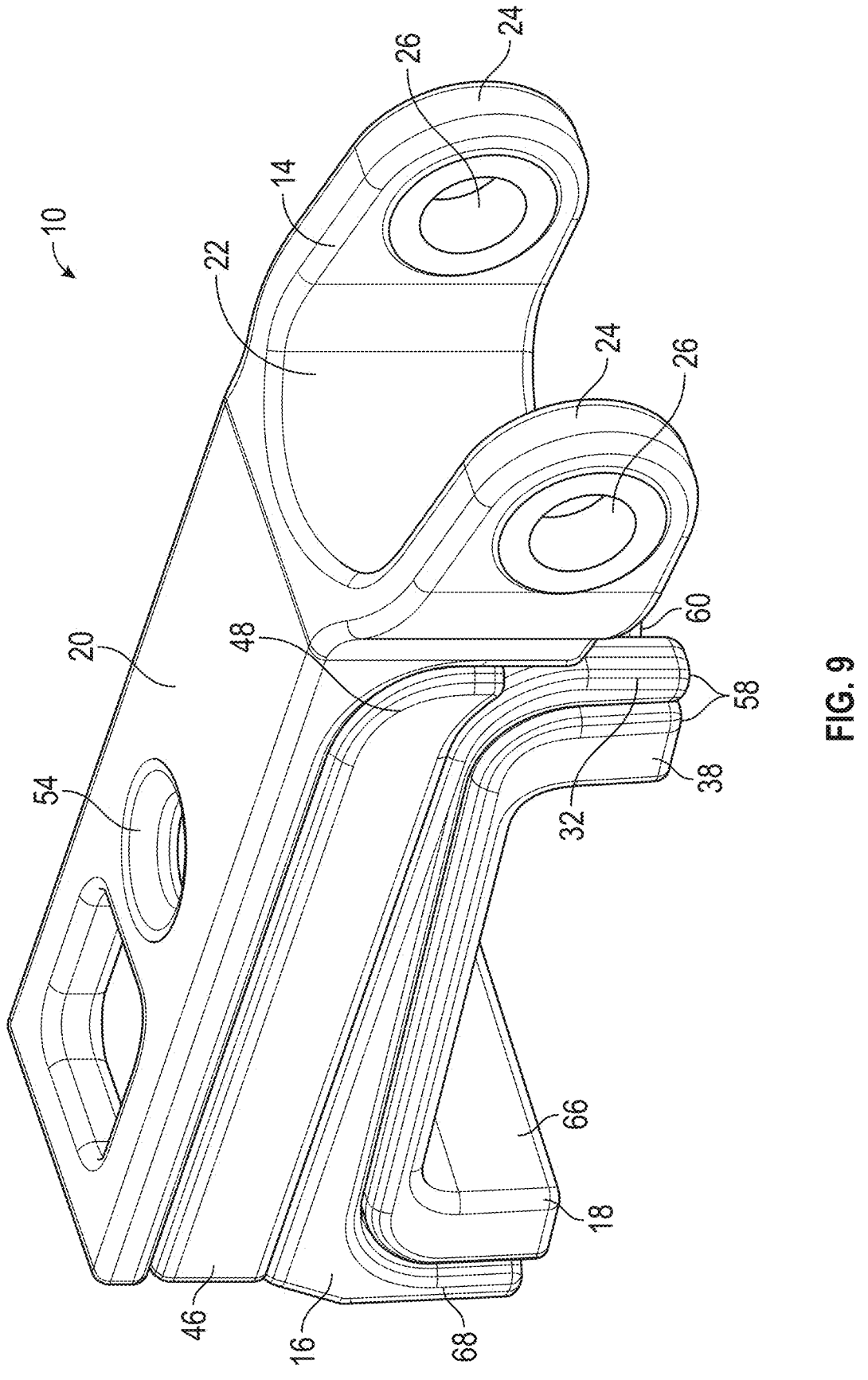
FIG. 9 is a side perspective view of the present modular axle clamp and riser system with the lower spacer.
Figure 10:
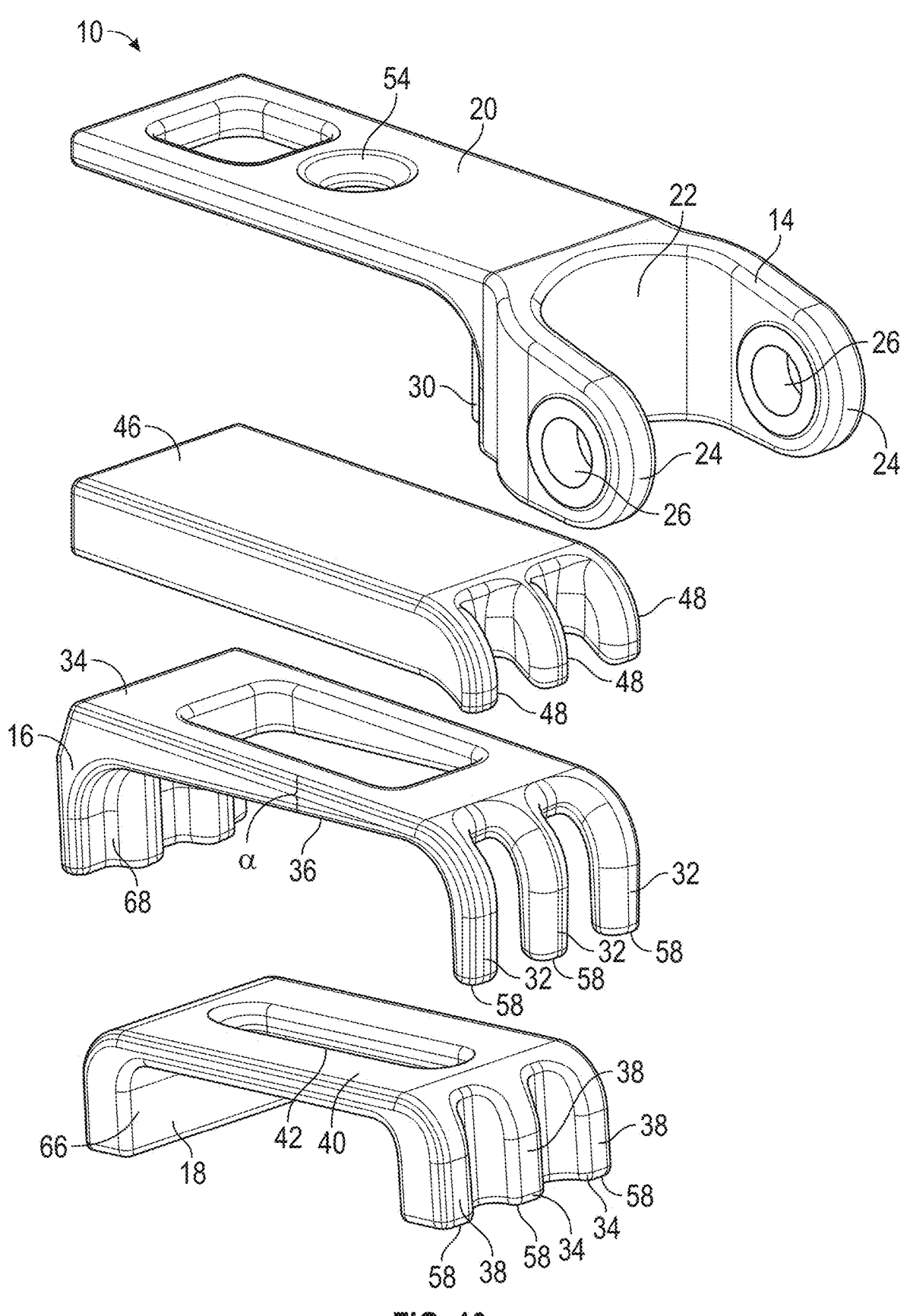
FIG. 10 is a side exploded perspective view of the present modular axle clamp and riser system with the lower spacer.
Figure 11:
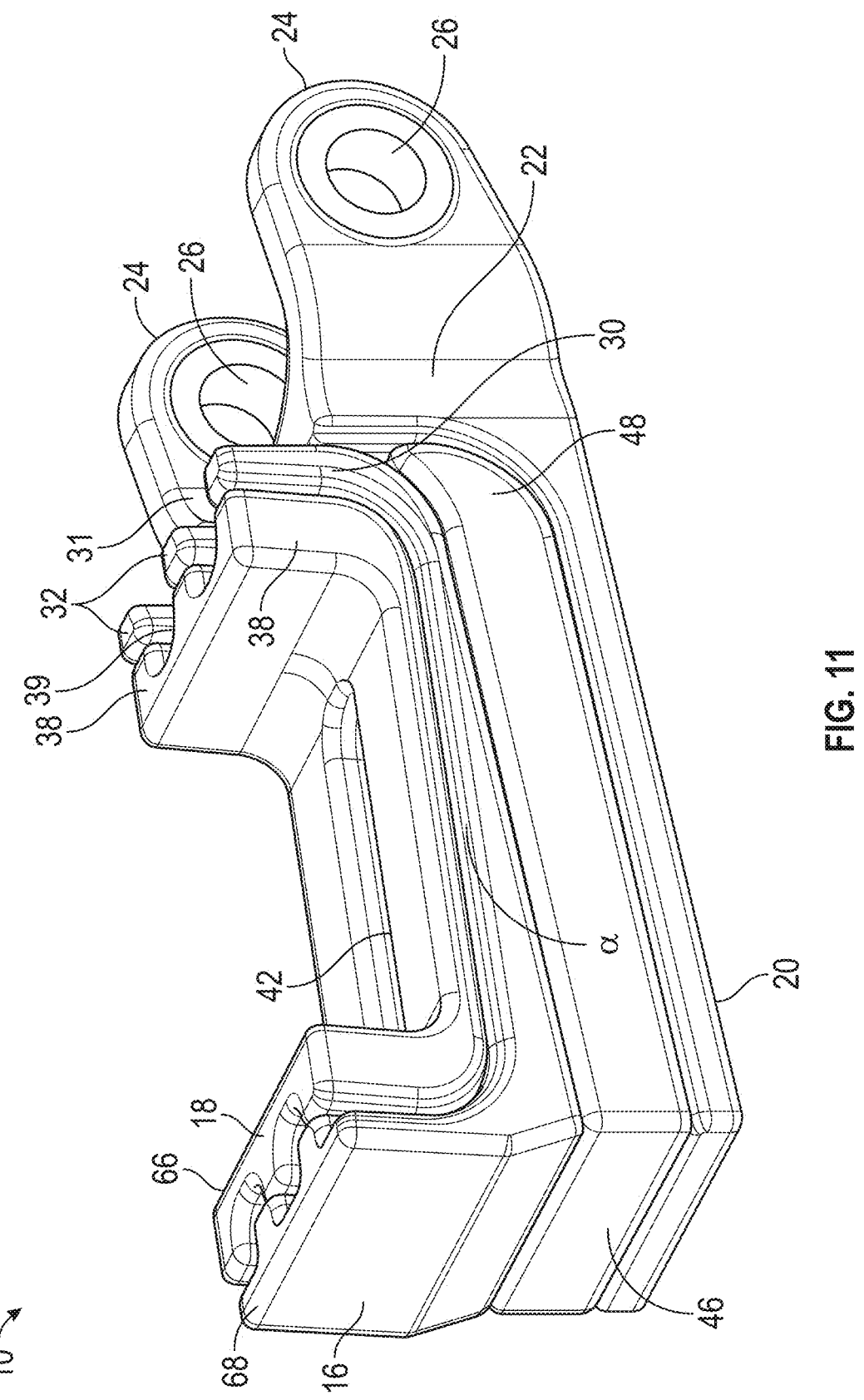
FIG. 11 is a bottom perspective view of the present modular axle clamp and riser system with the lower spacer.
Figure 12:
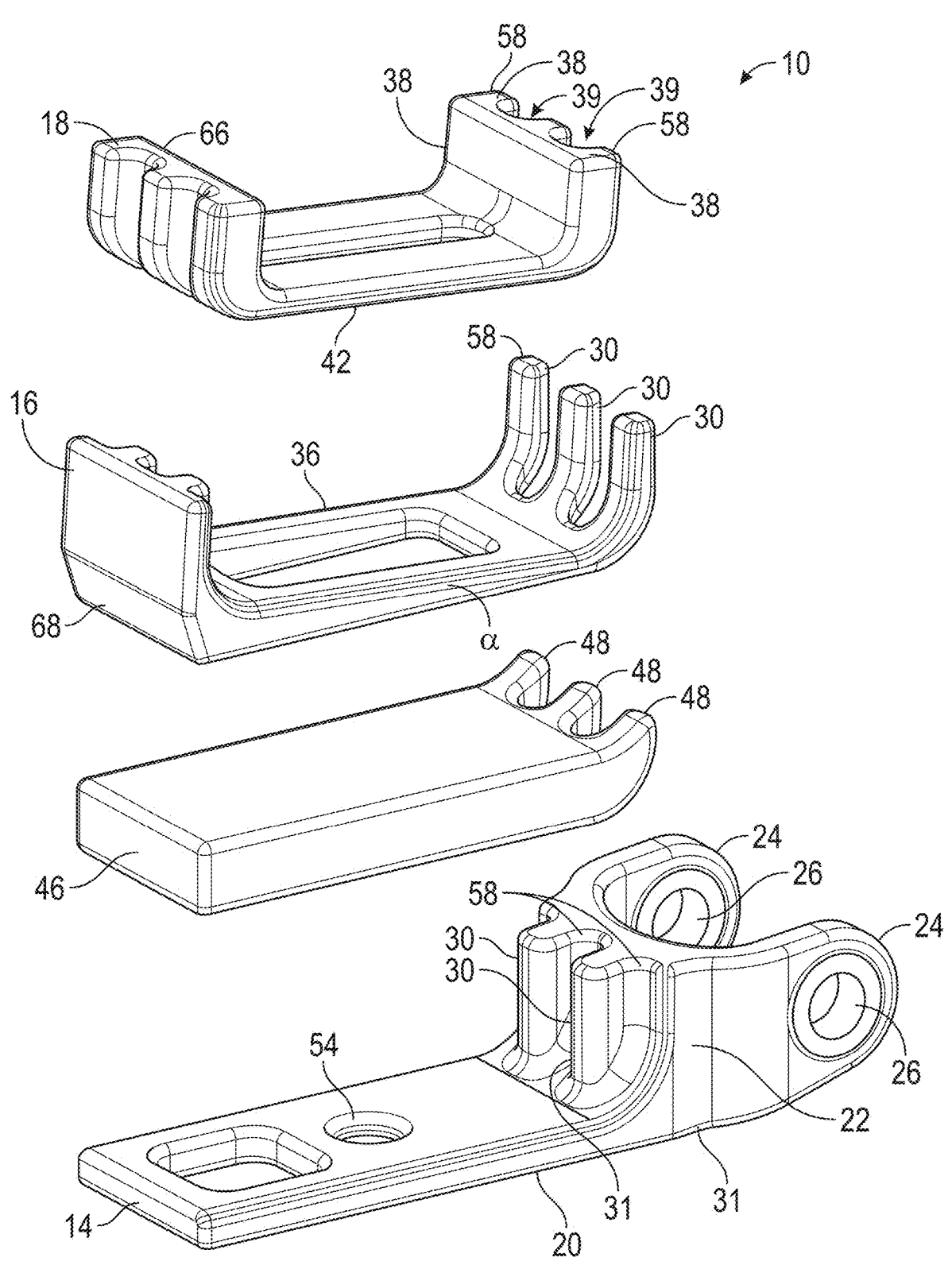
FIG. 12 is a bottom exploded perspective view of the present modular axle clamp and riser system with the lower spacer.
Figure 13:
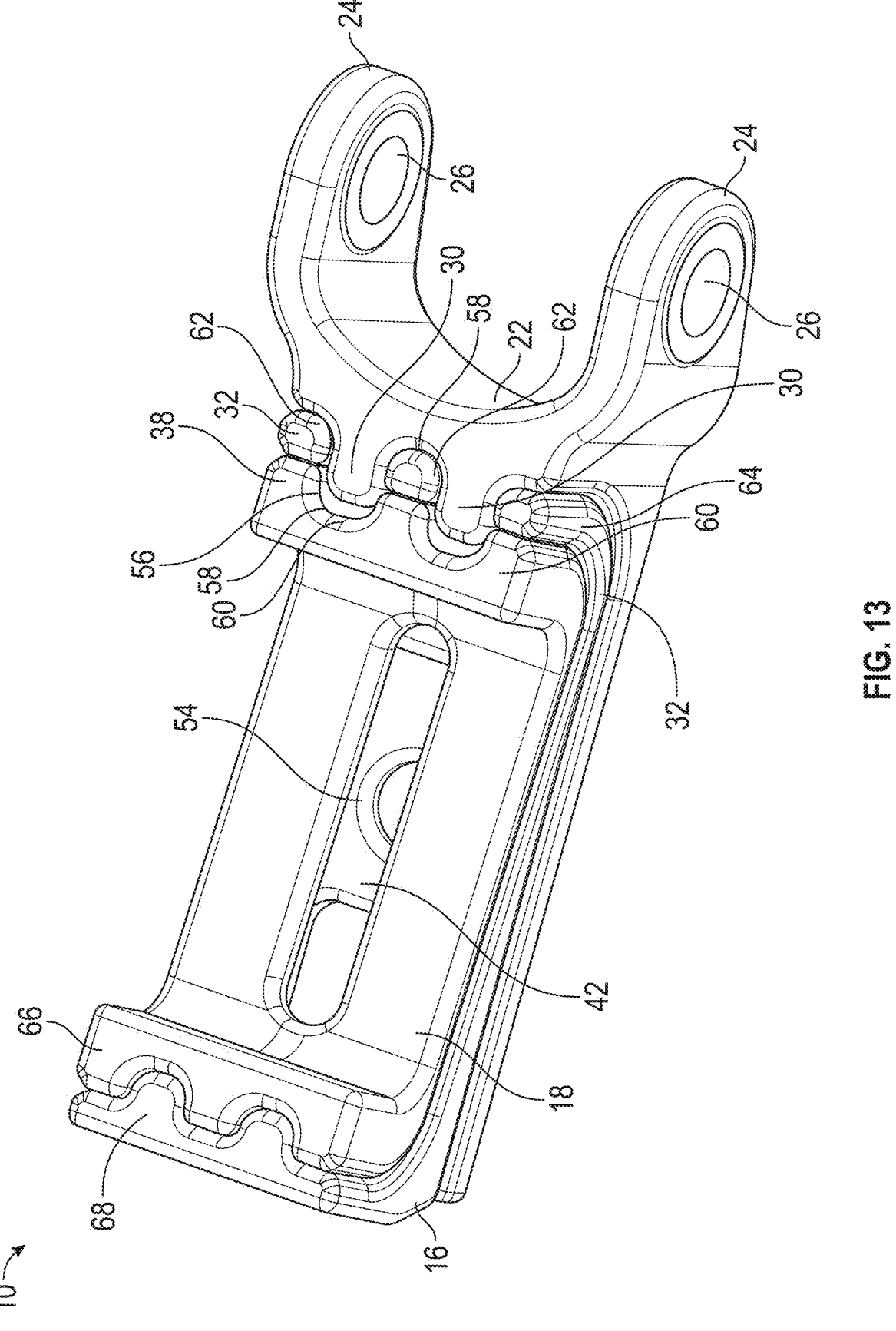
FIG. 13 is a bottom perspective view of the present modular axle clamp and riser system without spacers.
Figure 14:
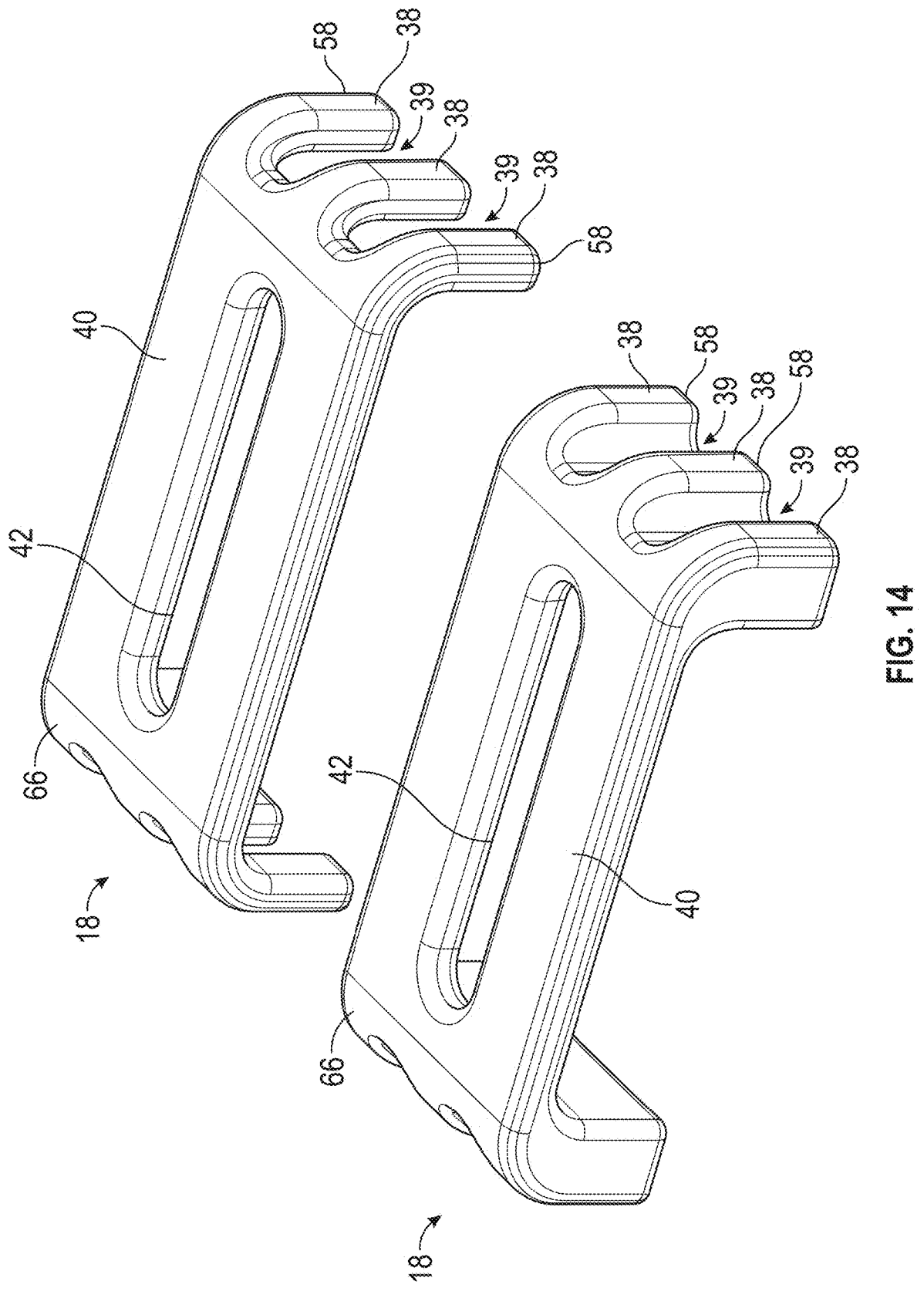
FIG. 14 is a top perspective view of two axle mounts of the present modular axle clamp and riser system.
Figure 15:
FIG. 15 is a bottom plan view of the two axle mounts of the modular axle clamp and riser system from FIG. 15.

Referring now to FIGS. 1-23, the present modular axle clamp and riser system is generally designated 10 and is shown in conjunction with a suspension system 12. As shown in FIGS. 3 and 6, the modular axle clamp and riser system 10 includes a top mount 14, a wedge 16, and an axle mount 18. The top mount 14 includes a substantially flat upper surface 20, a body 22, and a pair of opposing ears 24. Additionally, the ears 24 include eyelets 26 which accommodate a torque arm 28. Preferably, the torque arm 28 is connected to the eyelets 26 by one of a bar pin, a through bolt, or an hourglass bushing. However, alternate means for connecting the torque arm 28 to the eyelets are contemplated as is known in the art.

Figure 18:
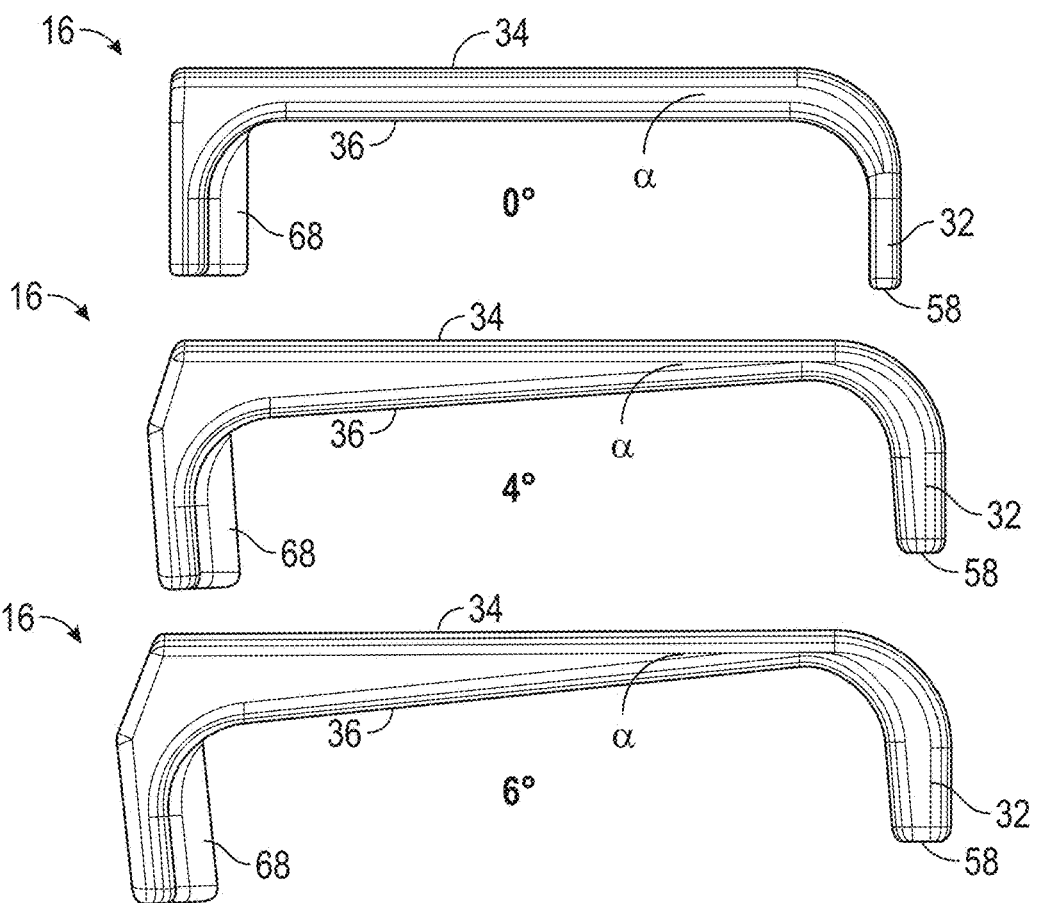
FIG. 18 is a side plan view of wedges of the present modular axle clamp and riser system which have different pinion angles.
Figure 19:
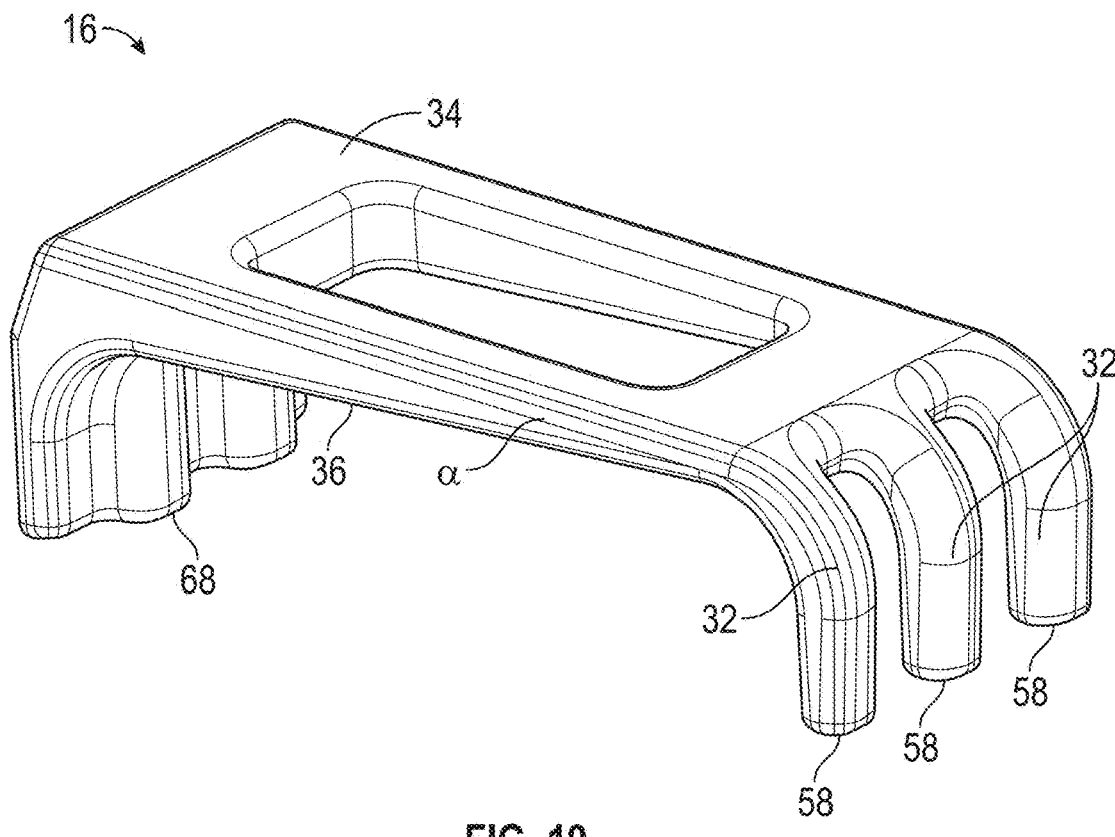
FIG. 19 is side perspective view of the wedge the present modular axle clamp and riser system.
Figure 20:
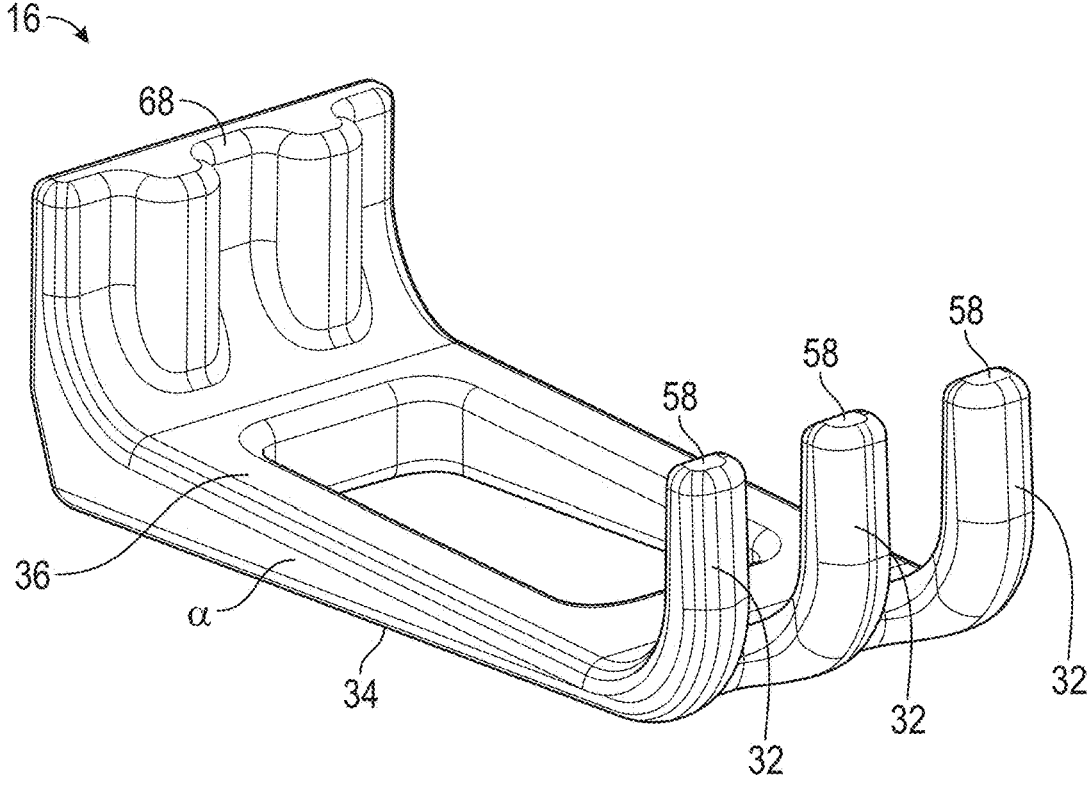
FIG. 20 is side perspective view of the wedge the present modular axle clamp and riser system.
Figure 21:
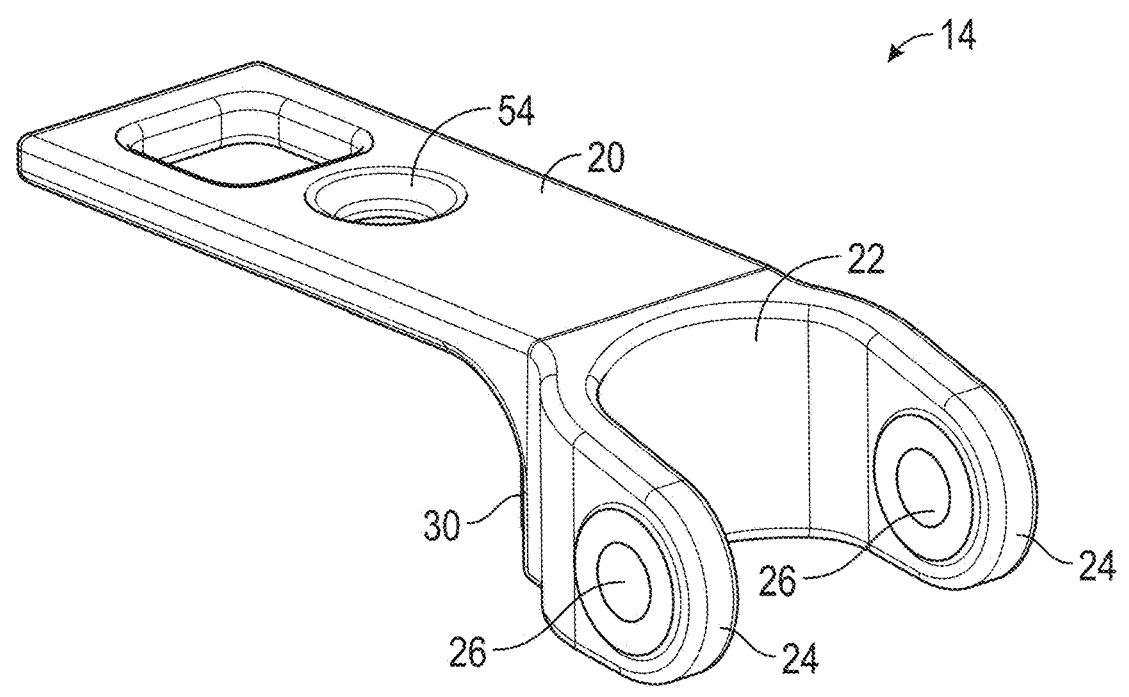
FIG. 21 is side perspective view of a top mount the present modular axle clamp and riser system.
Figure 22:
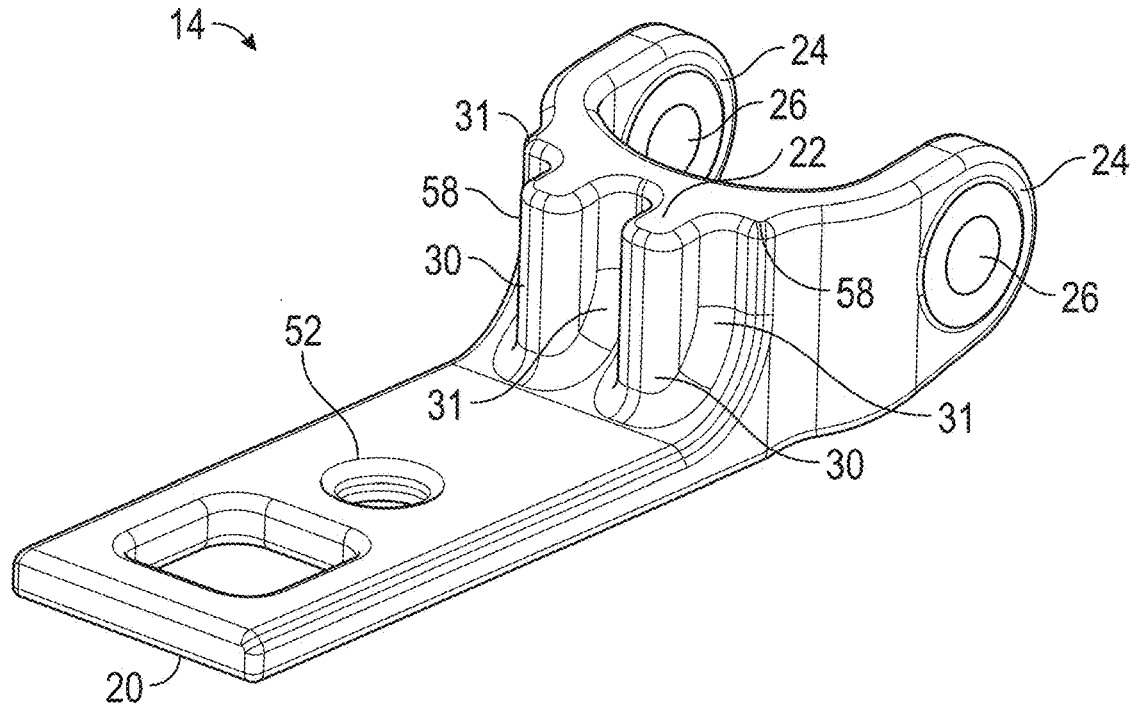
FIG. 22 is side perspective view of the top mount the present modular axle clamp and riser system.
Figure 23:
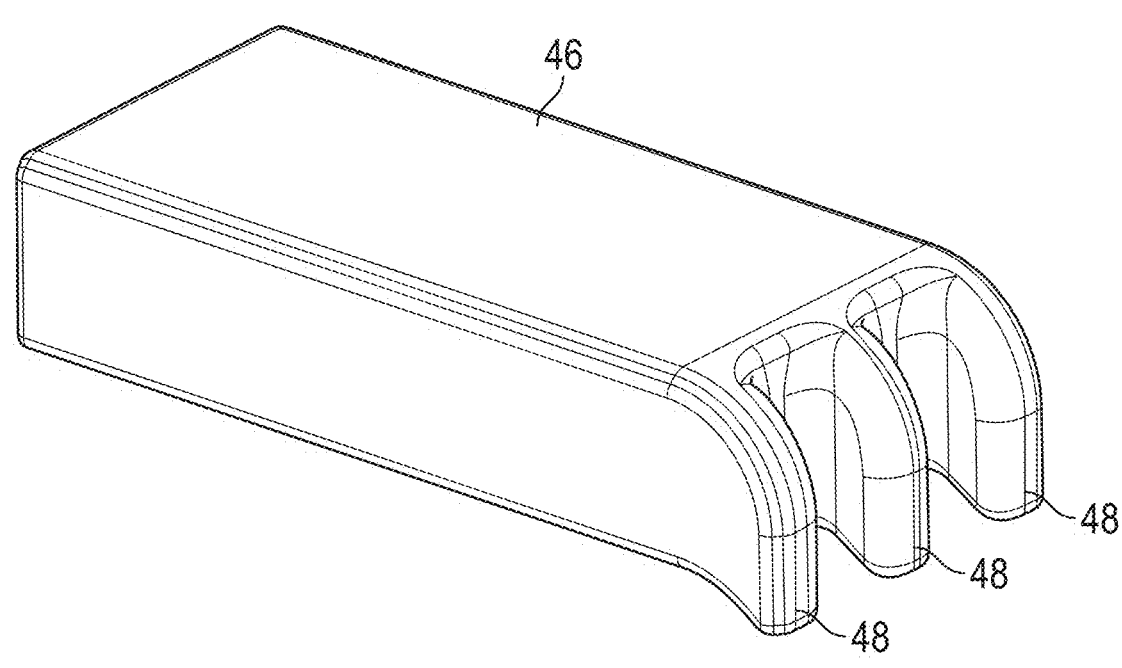
FIG. 23 is side perspective view of the lower spacer the present modular axle clamp and riser system.

Moreover, the top mount 14 matingly engages the wedge 16 by way of top mount teeth 30 and wedge teeth 32. Further, the wedge 16 includes a wedge upper surface 34 which is parallel to the top mount flat upper surface 20. Importantly, the wedge includes a pinion angle surface 36, such that a pinion angle α is defined as the angle between the pinion angle surface 36 and the top mount flat upper surface 20. FIG. 18 illustrates three different pinion angles α, namely zero, four and six degrees. These particular pinion angles α are merely illustrative, as many different pinion angles α optionally are used.

Figure 16:
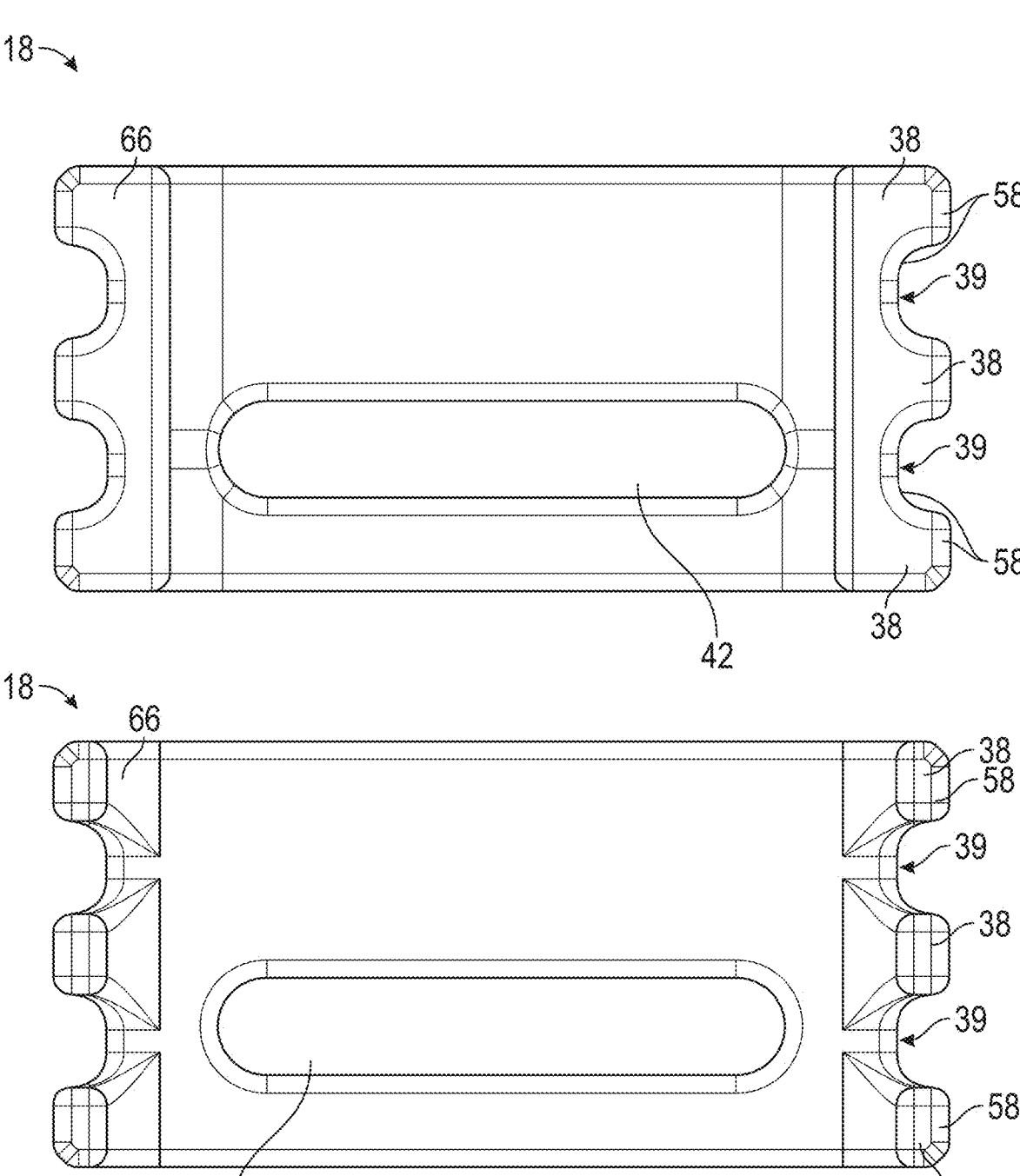
FIG. 16 is a bottom plan view of two axle mount of the present modular axle clamp and riser system with an offset guide slot.
Figure 17:
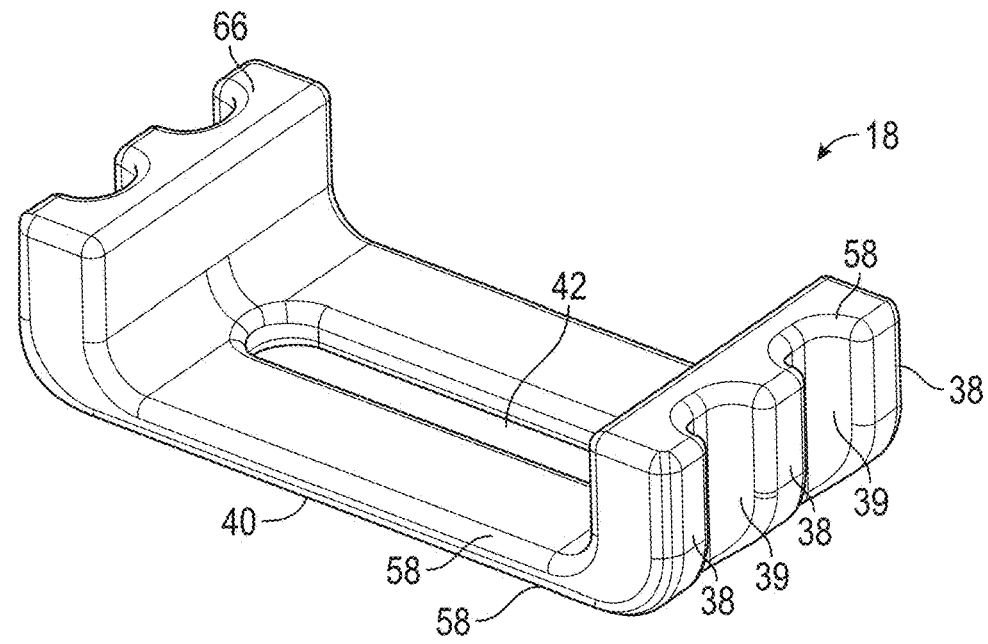
FIG. 17 is a bottom plan view of the axle mount of the present modular axle clamp and riser system.

Additionally, the axle mount 18 has teeth 38 which matingly engage the at least one of the wedge teeth 32 and the top mount teeth 30. An axle mount upper surface 40 has a guide slot 42 intended to accommodate a dowel pin (not shown) located on an axle 44. The dowel pin is either welded or otherwise attached to the axle 44 as is known in the art. An important feature of the guide slot 42 is its location within the axle mount 18. Specifically, the guide slot 42 is optionally offset from the center of the axle mount upper surface 40 depending on the application, as shown in FIG. 16.

Figure 25:
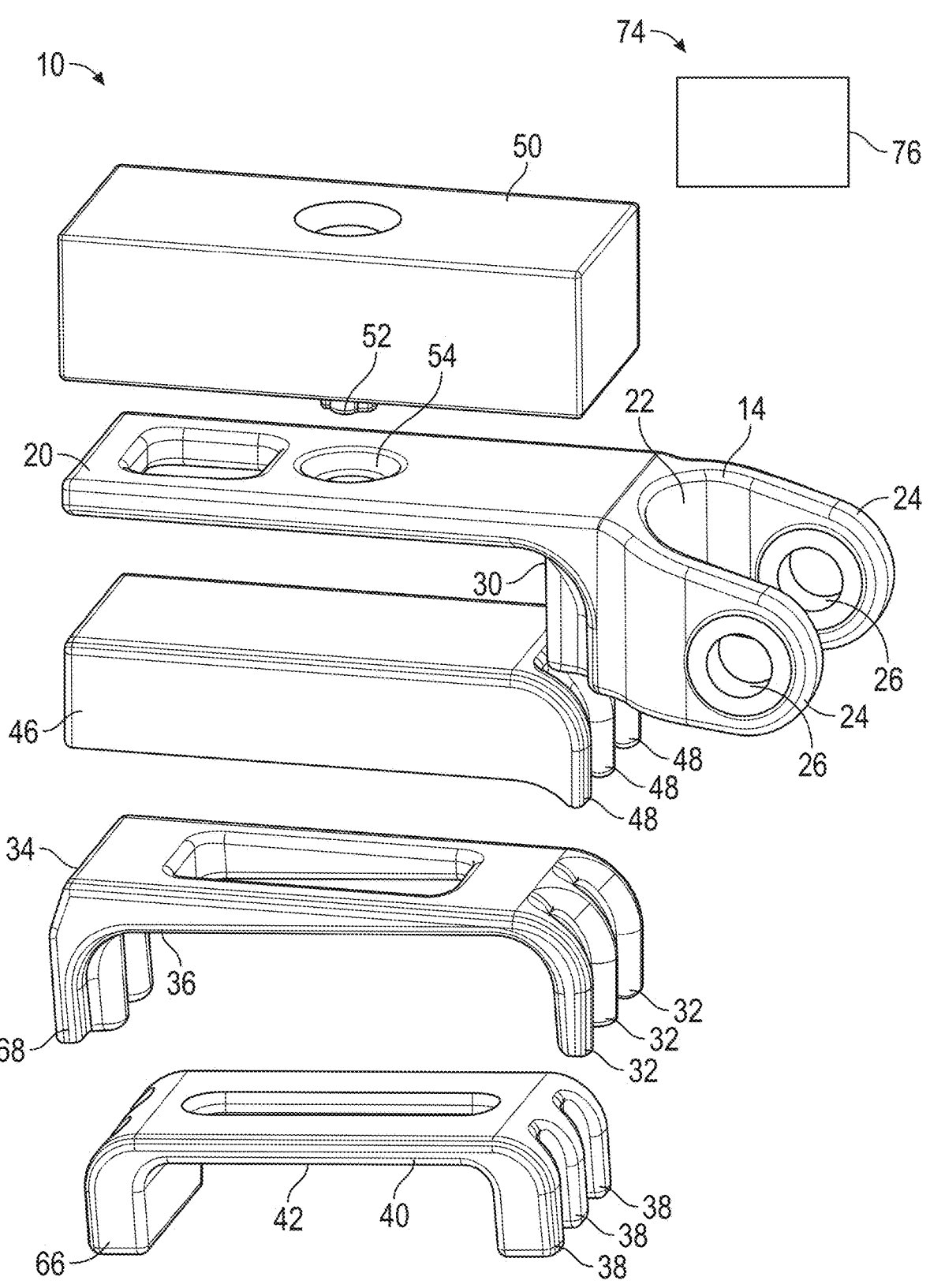
FIG. 25 is a side exploded plan view a smart part numbering system for the present modular axle clamp and riser system.

In addition, the modular axle clamp and riser system optionally includes a lower spacer 46 which includes lower spacer teeth 48. Preferably, the lower spacer teeth 48 matingly engage at least one of the top mount teeth 30 and the wedge teeth 32. Another optional feature is an upper spacer 50, which is best shown in FIG. 25. Preferably, the upper spacer 50 includes a locating post 52 which fits within a locating hole 54 in the top mount 14.

A feature of the modular axle clamp and riser system 10 is an interface 56 which is formed by the mating engagement between the top mount teeth 30, the wedge teeth 32, and the axle mount teeth 38. Moreover, rounded edges 58 of the top mount teeth 30, the wedge teeth 32, and the axle mount teeth 38 form a channel 60 at the interface 56. This is significant for several reasons, the first of which is that it allows for a better weld, as the weld material is able to beyond the surface of the materials being welded. Moreover, the presence of the channel 60 means that the parts do not have to be pre-processed before they are welded. Traditionally, flat parts that are welded together need to be machined to create a groove into which the weld material will go. However, with preformed channels 60 created by the rounded edges 58 at the interface 56, there is no need to prepare the parts for welding. Finally, with the channels 60 created by the rounded edges 58, the welding can be done robotically.

Along the interface 56, there is at least one portion 62 which is transverse to a direction of loading for the modular axle clamp and riser system 10. Including welding lines which are transverse to the direction of loading significantly increases the strength of the weld. In an example configuration, the at least one axle mount tooth 38 is directly in front of the at least one wedge tooth 32, the at least one axle mount tooth 38 fits within at least one top mount recess 31, and the at least one top mount tooth 30 fits within at least one axle mount recess 39, whereby the at least one wedge tooth 32 is located between the at least one axle mount tooth 38 and the at least one top mount recess 31. Further, the at least one axle mount tooth 38 and the at least one axle mount cavity 39 alternate with the at least top mount tooth 30 and the at least one top mount cavity 31.

Figure 24:
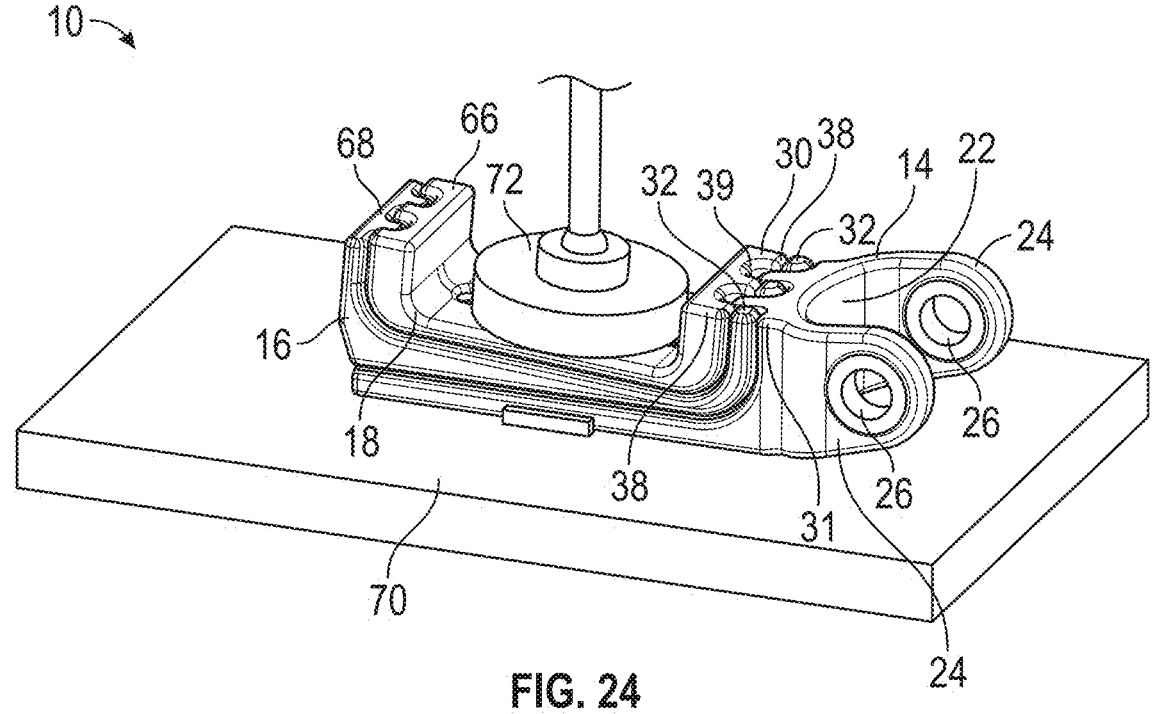
FIG. 24 is side perspective view of a manufacturing process of the present modular axle clamp and riser system.

FIG. 24 illustrates an exemplary means for manufacturing the modular axle clamp and riser system 10. In particular, the top mount 14, the wedge 16 and the axle mount 18 are assembled in the proper orientation and held against a table 70 by a pneumatic clamp 72. Once the components of the modular axle clamp and riser system 10 are assembled and held in place by the table 70 and pneumatic clamp 72, the components are welded together along the interface 56. Other means for permanently affixing the components of the modular axle clamp and riser system 10 are also contemplated as is known in the art.

FIG. 25 shows an example smart part numbering system 74 for the modular axle clamp and riser system 10. Specifically, the smart part numbering system 74 includes a computer processor 76 which has a non-transitory, computer-readable medium encoded with computer-readable instructions that, are executed by the computer processor 76. The instructions cause the computer processor 76 to generate a unique part number for each component of the modular axle clamp and riser system 10. The unique part number includes a component level digit which specifies the particular component type, and at least one variation level digit which is associated with various design features of the components of the modular axle clamp and riser system 10. Further, each set of design parameters for a given component are denoted with a single unique part number which includes the component level digit and the at least one variation level digit.

Providing the present smart part numbering system 74 significantly increases the ease of manufacturing the modular axle clamp and riser system 10. Welding of the modular axle clamp and riser system 10 can be done robotically, inventory management is simplified, and consumers have a less complicated process for ordering their requested the modular axle clamp and riser system 10.

While a particular embodiment of the present modular axle clamp and riser system has been described herein, it will be appreciated by those skilled in the art that changes and modifications may be made thereto without departing of the invention in its broader aspects and as set forth in the following claims.

The invention claimed is:

1. A method of manufacturing a modular axle clamp and riser system for use in a suspension system, said modular axle clamp and riser system comprising the following components:

a top mount, said top mount comprising:
  a substantially flat upper surface;
  a top mount body which extends transversely to said flat upper surface;
  a pair of opposing ears which extend from said top mount body, said ears including eyelets for receiving a torque arm of said suspension system; and
  at least one top mount tooth extending from said top mount body in a direction opposite said ears;
a wedge including at least one wedge tooth which matingly engages said at least one top mount tooth, a wedge upper surface, and a pinion angle surface, said wedge defining a pinion angle between said wedge upper surface and said pinion angle surface, said wedge upper surface being parallel to said flat upper surface; and
an axle mount comprising at least one axle mount tooth which matingly engages at least one of said at least one top mount tooth and said at least one wedge tooth;
said method comprising:
utilizing a smart part numbering system comprising a computer processor and a non-transitory, computer-readable medium encoded with computer-readable instructions that, when executed by said computer processor, cause said smart part numbering system to perform the steps of:

generating a unique part number for each of said components of said modular axle clamp and riser system, said part number including a component level digit which specifies the particular component type, and at least one variation level digit which is associated with various design features of said components, such that the design parameters for a given component are denoted with a single unique part number which includes said component level digit and said at least one variation level digit;

storing said unique part numbers in a part library along with the specific design parameters associated with said unique part number;

receiving one or more user inputs, each said user input indicating a selection of either the design parameters or said unique part number combination desired for said modular axle clamp and riser system;

determining a requested modular axle clamp and riser system based on either the design parameters or said unique part number combination provided by the user; and generating said requested modular axle clamp and riser system.

2. The of claim 1, wherein said step of generating said requested modular axle clamp and riser system further comprises welding together of each component of the requested modular axle clamp and riser system.

3. The of claim 2, wherein said step of generating said requested modular axle clamp and riser system is done robotically.

* * * * *